(12) United States Patent
Lin (10) Patent No.: US 12,367,698 B2
(45) Date of Patent: Jul. 22, 2025

(54) CROSS-REGION DOCUMENT CONTENT RECOGNITION METHOD, APPARATUS AND MEDIUM

(71) Applicant: Beijing Paoding Technology Co., Ltd, Beijing (CN)

(72) Inventor: Demiao Lin, Beijing (CN)

(73) Assignee: Beijing Paoding Technology Co., Ltd, Beijing (CN)

( * ) Notice: Subject to any disclaimer, the term of this patent is extended or adjusted under 35 U.S.C. 154(b) by 386 days.

(21) Appl. No.: 18/100,785

(22) Filed: Jan. 24, 2023

(65) Prior Publication Data

US 2024/0021004 A1 Jan. 18, 2024

(30) Foreign Application Priority Data

Jul. 13, 2022 (CN) .......................... 202210820091.8

(51) Int. Cl.
*G06V 30/416* (2022.01)
*G06V 10/94* (2022.01)
*G06V 30/413* (2022.01)
*G06V 30/42* (2022.01)

(52) U.S. Cl.
CPC .......... *G06V 30/416* (2022.01); *G06V 30/413* (2022.01); *G06V 30/42* (2022.01); *G06V 10/945* (2022.01)

(58) Field of Classification Search
CPC .................................................... G06V 10/945
See application file for complete search history.

(56) References Cited

U.S. PATENT DOCUMENTS

| 8,254,681 B1 * | 8/2012 | Poncin .................... G06F 40/20 |
| | | 382/229 |
| 2008/0243814 A1 * | 10/2008 | Gurcan .................. G06F 16/80 |
| | | 707/999.005 |

* cited by examiner

*Primary Examiner* — Casey L Kretzer (57) ABSTRACT

Embodiments of the present disclosure disclose a cross-region document content recognition method, device, apparatus, medium, and program product. A specific implementation of the method includes: performing a document structure recognition processing on an untagged document; for every two adjacent document page numbers in the document page number sequence: selecting a document structure recognition result that corresponds to a first document page number and satisfies a preset tail area condition, as a tail document structure recognition result; selecting a document structure recognition result that corresponds to a second document page number and satisfies a preset head area condition, as a head document structure recognition result; performing a merged detection on the tail document structure recognition result and the head document structure recognition result; in response to the tail document structure recognition result and the head document structure recognition result being mergeable.

8 Claims, 3 Drawing Sheets

FIG. 3

CROSS-REGION DOCUMENT CONTENT RECOGNITION METHOD, APPARATUS AND MEDIUM

CROSS-REFERENCE TO RELATED APPLICATIONS

The present application is based on, and claims priority from, Chinese application number 202210820091.8, filed Jul. 13, 2022, the disclosure of which is hereby incorporated by reference herein in its entirety.

TECHNICAL FIELD

Embodiments of the present disclosure relate to the technical field of text recognition, and in particular, to a cross-region document content recognition method, apparatus and medium.

BACKGROUND

Untagged documents, such as PDF files, can be easier to read and display the page with the same effect on different devices. At present, when recognizing the document content of an untagged document, a method usually adopted is: recognizing only the document content of a single document block in a single page.

However, the inventor found that when using the above method to recognize the document content of the untagged document, there are often the following technical problems:

Firstly, the continuous document content in different pages cannot be recognized, and users need to operate on the continuous document content in different pages respectively, which makes it impossible to quickly perform unified operations on the continuous document content in different pages.

Secondly, the continuous document content in different document columns cannot be recognized, and users need to operate on the continuous document content in different document columns respectively, which makes it impossible to quickly perform unified operations on the continuous document content in different document columns.

The above information disclosed in the background section is only for enhancement of understanding of the background of this inventive concept and therefore it may contain information that does not form the prior art already known to a person of ordinary skill in the art in this country.

SUMMARY

The content of the present disclosure is to introduce ideas in a brief form, and these ideas will be described in detail in the following section of the detailed description of the invention. The content of the present disclosure is not intended to identify the key features or essential features of the claimed technical solution, nor is it intended to limit the scope of the claimed technical solution.

Some embodiments of the present disclosure propose a cross-region document content recognition method, electronics apparatus and computer-readable medium for an untagged document to solve one or more of the technical problems mentioned in the above background section.

In the first aspect, some embodiments of the present disclosure provide a cross-region document content recognition method for an untagged document, the method comprising: performing a document structure recognition processing on the untagged document to obtain a document structure recognition result set, wherein the document structure recognition results in the document structure recognition result set correspond to document page numbers; for every two adjacent document page numbers in the document page number sequence corresponding to the untagged document, performing the following steps to: determine a first document page number in the two adjacent document page numbers as the first document page number, and a second document page number in the two adjacent document page numbers as the second document page number; select, from the document structure recognition result set, a document structure recognition result that corresponds to the first document page number and satisfies a preset tail area condition, as a tail document structure recognition result; select, from the document structure recognition result set, a document structure recognition result that corresponds to the second document page number and satisfies a preset head area condition, as a head document structure recognition result; perform a merged detection on the tail document structure recognition result and the head document structure recognition result, to obtain a merged detection result, wherein the merged detection result characterizes whether the tail document structure recognition result and the head document structure recognition result are mergeable document structure recognition results; in response to determining that the merged detection result characterizes the tail document structure recognition result and the head document structure recognition result being mergeable document structure recognition results, merge the tail document structure recognition result and the head document structure recognition result included in the document structure recognition result set, so as to update the document structure recognition result set.

In the second aspect, some embodiments of the present disclosure provide a cross-region document content recognition device for an untagged document, the device comprising: an recognition unit configured to perform a document structure recognition processing on the untagged document to obtain a document structure recognition result set, wherein the document structure recognition results in the document structure recognition result set correspond to document page numbers; an execution unit configured to, for every two adjacent document page numbers in the document page number sequence corresponding to the untagged document, perform the following steps to: determine a first document page number in the two adjacent document page numbers as the first document page number, and a second document page number in the two adjacent document page numbers as the second document page number; select, from the document structure recognition result set, a document structure recognition result that corresponds to the first document page number and satisfies a preset tail area condition, as a tail document structure recognition result; select, from the document structure recognition result set, a document structure recognition result that corresponds to the second document page number and satisfies a preset head area condition, as a head document structure recognition result; perform a merged detection on the tail document structure recognition result and the head document structure recognition result, to obtain a merged detection result, wherein the merged detection result characterizes whether the tail document structure recognition result and the head document structure recognition result are mergeable document structure recognition results; in response to determining that the merged detection result characterizes the tail document structure recognition result and the head document structure recognition result being mergeable document structure recognition results, merge the tail document structure recognition result and the head document structure recognition result included in the document structure recognition result set, so as to update the document structure recognition result set.

In the third aspect, some embodiments of the present disclosure provide an electronic apparatus, comprising: one or more processors; a storage device on which one or more programs are stored, and when the one or more programs are executed by the one or more processors, the one or more processors are made to implement the method described in any of implementations in the first aspect above.

In the fourth aspect, some embodiments of the present disclosure provide a computer-readable medium on which a computer program is stored, wherein the program when executed by a processor implements the method described in any of implementations in the first aspect above.

In the fifth aspect, some embodiments of the present disclosure provide a computer program product, comprising a computer program which, when executed by a processor, implements the method described in any of implementations in the first aspect above.

The above embodiments of the present disclosure have the following beneficial effects: through the cross-region document content recognition method of some embodiments of the present disclosure, it is possible to quickly perform unified operations on the continuous document content in different pages. Specifically, the reason why it is impossible to quickly perform unified operations on the continuous document content in different pages lies in that the continuous document content in different pages cannot be recognized, and users need to operate on the continuous document content in different pages respectively, which makes it impossible to quickly perform unified operations on the continuous document content in different pages. Based on this, the cross-region document content recognition method of some embodiments of the present disclosure firstly performs a document structure recognition processing on the untagged document to obtain a document structure recognition result set. Wherein, the document structure recognition results in the document structure recognition result set correspond to document page numbers. Thereby, a document structure recognition result of the untagged document can be recognized in advance. Then, for every two adjacent document page numbers in the document page number sequence corresponding to the untagged document, the following steps are performed: in Step 1, determine a first document page number in the two adjacent document page numbers as the first document page number, and a second document page number in the two adjacent document page numbers as the second document page number. In Step 2, select from the document structure recognition result set a document structure recognition result that corresponds to the first document page number and satisfies a preset tail area condition, as a tail document structure recognition result. In Step 3, select from the document structure recognition result set a document structure recognition result that corresponds to the second document page number and satisfies a preset head area condition, as a head document structure recognition result. In Step 4, perform a merged detection on the tail document structure recognition result and the head document structure recognition result to obtain a merged detection result. Wherein, the merged detection result characterizes whether the tail document structure recognition result and the head document structure recognition result are mergeable document structure recognition results. Thus, it can be determined whether the document content at the end of the first page and the document content at the beginning of the second page of two adjacent pages are continuous. In Step 5, in response to determining that the merged detection result characterizes the tail document structure recognition result and the head document structure recognition result being mergeable document structure recognition results, merge the tail document structure recognition result and the head document structure recognition result included in the document structure recognition result set, so as to update the document structure recognition result set. Thus, when it can be determined that the document content at the end of the first page and the document content at the beginning of the second page of two adjacent pages are continuous, the document structure recognition result of the document content at the end of the first page and the document structure recognition result of the document content at the beginning of the second page are merged. Also because the document structure recognition results of the continuous document content in different pages can be merged, there is a relationship of association between the document structure recognition results of the continuous document content in different pages, so it is possible to perform unified operations on the continuous document content in different pages, without the need for the user to respectively operate on the continuous document content in different pages. Therefore, unified operations can be performed on the continuous document content in different pages quickly.

BRIEF DESCRIPTION OF THE DRAWINGS

The above and other features, advantages, and aspects of the embodiments of the present disclosure will become more apparent in conjunction with the accompanying drawings and with reference to the following embodiments. Throughout the drawings, the same or similar reference signs indicate the same or similar elements. It should be understood that the drawings are schematic, and the components and elements are not necessarily drawn to scale.

DETAILED DESCRIPTION

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be noted that, for ease of description, only the portions related to the relevant invention are shown in the drawings. In the case of no confliction, the embodiments in the present disclosure and the features in the embodiments can be combined with each other.

It should be noted that concepts such as "first" and "second" mentioned in the present disclosure are only used to distinguish different devices, modules or units, and are not used to limit the order or interdependence of functions performed by these devices, modules or units.

It should be noted that such adjuncts as "one" and "more" mentioned in the present disclosure are illustrative, not restrictive, and those skilled in the art should understand that, unless the context clearly indicates otherwise, they should be understood as "one or more".

The names of messages or information exchanged between multiple devices in the embodiments of the present disclosure are only for illustrative purposes, and are not intended to limit the scope of these messages or information.

The present disclosure will be described in detail below with reference to the accompanying drawings and in conjunction with embodiments.

Figure 1:
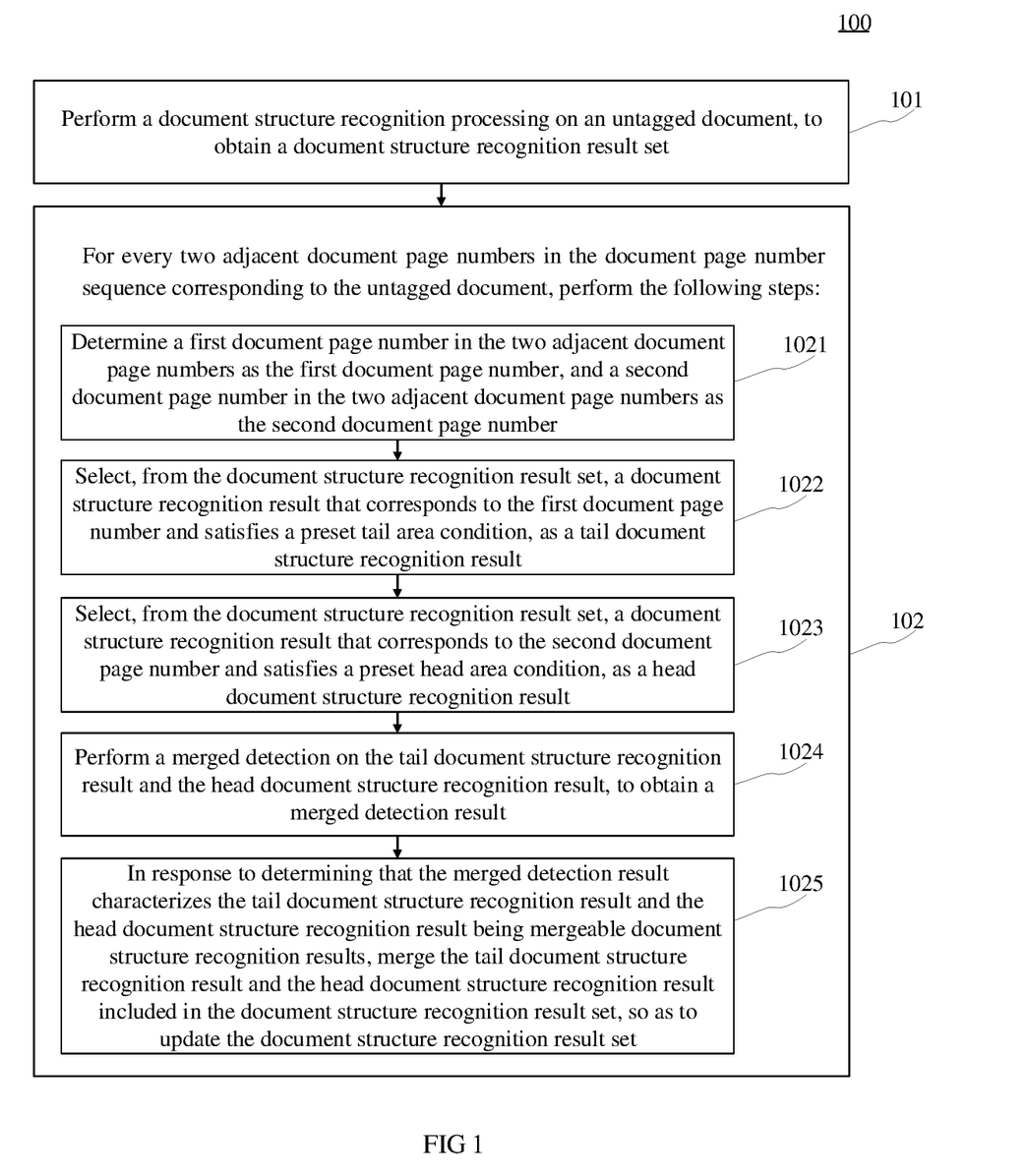
FIG. 1 is a flowchart of some embodiments of a cross-region document content recognition method according to the present disclosure.

FIG. 1 shows a flow 100 of some embodiments of a cross-region document content recognition method according to the present disclosure. The cross-region document content recognition method is for an untagged document, comprising the following steps:

Step 101, perform a document structure recognition processing on the untagged document to obtain a document structure recognition result set.

In some embodiments, the execution body (e.g., a computing device) of the cross-region document content recognition method may perform a document structure recognition processing on the untagged document to obtain a document structure recognition result set. Wherein, the untagged document may be a document with no structured label to identify the document structure. For example, the untagged document may be, but not limited to, a PDF (Portable Document Format) document. The document structure recognition result may be a recognition result obtained by performing document structure recognition on the document content. The document structure recognition result may include, but is not limited to, at least one of the following: text content, image, and table. The document structure recognition result may also include, but is not limited to, text type. The text content may include the recognized text. The text type can be the type of document content. For example, the text type may include but is not limited to: text class, chart class, image class, and table class. In practice, the above execution body may perform document structure recognition on the untagged document by means of target detection, to obtain a document structure recognition result set. Each document structure recognition result in the document structure recognition result set corresponds to a document block of the untagged document. The document block may be an independent part of the document content in the untagged document page of the untagged document. For example, a document block may be a paragraph of text or a piece of image. The untagged document page may be one page of the untagged document. The document structure recognition results in the document structure recognition result set correspond to document page numbers. A document page number is the page number of the untagged document page in the untagged document.

In practice, the above execution body may also delete the document structure recognition result corresponding to the header and the document structure recognition result corresponding to the footer, from the above document structure recognition result set, to update the document structure recognition result set.

It should be noted that the above computing device may be hardware or software. When the computing device is hardware, it can be implemented as a distributed cluster composed of multiple servers or terminal devices, or can be implemented as a single server or a single terminal device. When the computing device is embodied as software, it may be installed in the hardware devices listed above. It can be implemented, for example, as multiple software or software modules for providing distributed services, or as single software or software module. No specific limitation is made here.

It should be understood that the number of computing devices is merely illustrative. There may be any number of computing devices depending on implementation needs.

Step 102, for every two adjacent document page numbers in the document page number sequence corresponding to the untagged document, perform the following steps:

Step 1021, determine a first document page number in the two adjacent document page numbers as the first document page number, and a second document page number in the two adjacent document page numbers as the second document page number.

In some embodiments, the above execution body may determine a first document page number in the two adjacent document page numbers as the first document page number, and a second document page number in the two adjacent document page numbers as the second document page number. Wherein, the document page number sequence may be a sequence formed in proper order by the page number of each untagged document page of the untagged document. Thus, two adjacent document page numbers can be distinguished by the first document page number and the second document page number.

Step 1022, select, from the document structure recognition result set, a document structure recognition result that corresponds to the first document page number and satisfies a preset tail area condition, as a tail document structure recognition result.

In some embodiments, the above execution body may select, from the document structure recognition result set, a document structure recognition result that corresponds to the first document page number and satisfies a preset tail area condition, as a tail document structure recognition result. Wherein, the preset tail area condition may be that the position of the document block corresponding to the document structure recognition result is at the bottom position of the untagged document page. Here, the position can be expressed in a document coordinate or multiple document coordinates. There is no restriction on the limitation of the document coordinates of the bottom position. For example, the position of a document block can be expressed in document coordinates at the lower right corner of the document block. The bottom position can be represented by the four vertices of the bottom quadrilateral area. The above preset tail area condition may be that the position of the document block corresponding to the document structure recognition result is within the bottom quadrilateral area of the untagged document page. In practice, the above execution body may select, from the document structure recognition result set, a document structure recognition result whose corresponding document page number is the same as the first document page number and satisfies the preset tail area condition, as the tail document structure recognition result.

Alternatively, the untagged document may be a columnar document. A columnar document may be a document displayed in at least two columns. For example, the number of columns in the untagged document may be 2. At this time, the untagged document may be a two-column document. The two-column document includes a first column and a second column.

In certain optional implementations of some embodiments, the above execution body may select, from the document structure recognition result set, a document structure recognition result that corresponds to the first document page number and satisfies the preset tail area condition and the preset tail column condition, as the tail document structure recognition result. Wherein, the preset tail column condition may be that the column corresponding to the document structure recognition result is the second column. Thus, when the untagged document is a two-column document, the document structure recognition result at the end of the second column can be determined as the tail document structure recognition result.

Step 1023, select, from the document structure recognition result set, a document structure recognition result that corresponds to the second document page number and satisfies a preset head area condition, as a head document structure recognition result.

In some embodiments, the above execution body may select, from the document structure recognition result set, a document structure recognition result that corresponds to the second document page number and satisfies the preset head area condition, as a head document structure recognition result. Wherein, the preset head area condition may be that the position of the document block corresponding to the document structure recognition result is in the head position of the untagged document page. Here, the position can be expressed in a document coordinate or multiple document coordinates. There is no restriction on the limitation of the document coordinates of the head position. For example, the position of a document block can be expressed in document coordinates at the lower right corner of the document block. The head position can be represented by the four vertices of the head quadrilateral area. The preset head area condition may be that the position of the document block corresponding to the document structure recognition result is within the head quadrilateral area of the untagged document page. In practice, the above execution body may select, from the document structure recognition result set, a document structure recognition result whose corresponding document page number is the same as the second document page number and satisfies the preset head area condition, as the head document structure recognition result.

In certain optional implementations of some embodiments, the above execution body may select from the document structure recognition result set a document structure recognition result that corresponds to the second document page number and satisfies the preset head area condition and the preset head column condition, as the head document structure recognition result. Wherein, the preset head column condition may be that the column corresponding to the document structure recognition result is the first column. Thus, when the untagged document is a two-column document, the document structure recognition result at the head of the first column can be determined as the head document structure recognition result.

Step 1024, perform a merged detection on the tail document structure recognition result and the head document structure recognition result, to obtain a merged detection result.

In some embodiments, the above execution body may perform a merged detection on the tail document structure recognition result and the head document structure recognition result, to obtain a merged detection result. Wherein, the merged detection result characterizes whether the tail document structure recognition result and the head document structure recognition result are mergeable document structure recognition results. In practice, firstly, the execution body may determine the document type of the tail document structure recognition result as a tail document type. Then, the document type of the head document structure recognition result may be determined as a head document type. Thereafter, based on the tail document type and the head document type, perform a merged detection on the tail document structure recognition result and the head document structure recognition result to obtain the merged detection result.

Alternatively, the above execution body can, through the following steps, perform a merged detection on the tail document structure recognition result and the head document structure recognition result according to the tail document type and the head document type, to obtain the merged detection result:

Step 1, in response to determining that the tail document type and the head document type are both text classes, determine whether the tail document structure recognition result contains an indented text line, and determine whether the head document structure recognition result contains an indented text line. Wherein, the indented text line can be a line that is indented, namely, the first line of a paragraph.

Step 2, in response to determining that the tail document structure recognition result contains an indented text line and the head document structure recognition result does not contain an indented text line, generate a merged detection result characterizing that the tail document structure recognition result and the head document structure recognition result are mergeable document structure recognition results. Here, the merged detection result characterizing that the tail document structure recognition result and the head document structure recognition result are mergeable document structure recognition results can be expressed in any form. For example, the merged detection result characterizing that the tail document structure recognition result and the head document structure recognition result are mergeable document structure recognition results may be "Join". Therefore, the paragraphs displayed in two pages can be recognized.

Alternatively, the above execution body can, through the following steps, perform a merged detection on the tail document structure recognition result and the head document structure recognition result according to the tail document type and the head document type, to obtain a merged detection result:

Step 1, in response to determining that the tail document type and the head document type are both image classes, determine whether the tail document structure recognition result and the head document structure recognition result correspond to the same image. In practice, the above execution body may cut out the image of the bottom area from the image included in the tail document structure recognition result, as a tail image. Wherein, the bottom area may be an area of a preset height upward from the bottom of the image. The width of the bottom area may be the width of the image included in the tail document structure recognition result. Here, the specific setting of the preset height is not limited. Then, the image of the head area may be cut out from the image included in the above head document structure recognition result, as the head image.

Wherein, the head area may be an area of a preset height downward from the top of the image. The width of the head area may be the width of the image included in the head document structure recognition result. After that, the image similarity between the tail image and the head image can be determined. Specifically, the execution subject may determine the image similarity between the tail image and the head image through an image similarity algorithm. The image similarity algorithm may include, but is not limited to, at least one of the following: a cosine similarity algorithm, a hash algorithm, a histogram algorithm, and a structural similarity measurement algorithm. Finally, in response to determining that the above image similarity is greater than a preset threshold, it may be determined that the tail document structure recognition result and the head document structure recognition result correspond to the same image. Here, the specific setting of the preset threshold is not limited. The tail document structure recognition result and the head document structure recognition result corresponding to the same image may characterize that: the image included in the tail document structure recognition result and the image included in the head document structure recognition result are two images split from the same image.

Step 2, in response to determining that the tail document structure recognition result and the head document structure recognition result correspond to the same image, generate a merged detection result characterizing that the tail document structure recognition result and the head document structure recognition result are mergeable document structure recognition results. Thereby, the image displayed in two pages can be recognized.

Alternatively, the above execution body can, through the following steps, perform a merged detection on the tail document structure recognition result and the head document structure recognition result according to the tail document type and the head document type, to obtain a merged detection result:

In the first step, in response to determining that the tail document type and the head document type are both table classes, determine whether the tail document structure recognition result and the head document structure recognition result correspond to the same table. In practice, the above execution body may determine that the tail document structure recognition result and the head document structure recognition result correspond to the same table, in response to determining that the table included in the tail document structure recognition result includes a header and the table included in the head document structure recognition result does not include a header.

Step 2, in response to determining that the tail document structure recognition result and the head document structure recognition result correspond to the same table, generate a merged detection result characterizing that the tail document structure recognition result and the head document structure recognition result are mergeable document structure recognition results. Thereby, the table displayed in two pages can be recognized.

Alternatively, the above execution body may, in response to determining that the tail document type and the head document type are different, generate a merged detection result characterizing that the tail document structure recognition result and the head document structure recognition result are not mergeable document structure recognition results. Here, the merged detection result characterizing that the tail document structure recognition result and the head document structure recognition result are not mergeable document structure recognition results may be expressed in any form. For example, the merged detection result characterizing that the tail document structure recognition result and the head document structure recognition result are not mergeable document structure recognition results may be "NoJoin". Therefore, when the tail document type and the head document type are different, it can be directly determined that the tail document structure recognition result and the head document structure recognition result are not mergeable.

Step 1025, in response to determining that the merged detection result characterizes the tail document structure recognition result and the head document structure recognition result being mergeable document structure recognition results, merge the tail document structure recognition result and the head document structure recognition result included in the document structure recognition result set, so as to update the document structure recognition result set.

In some embodiments, the above execution body may, in response to determining that the merged detection result characterizes the tail document structure recognition result and the head document structure recognition result being mergeable document structure recognition results, merge the tail document structure recognition result and the head document structure recognition result included in the document structure recognition result set, so as to update the document structure recognition result set. In practice, the execution body may splice the tail document structure recognition result and the head document structure recognition result included in the document structure recognition result set, so as to use the splicing result as the document structure recognition result. The splicing method may be a method of forming a list. After splicing, the document structure recognition result set is updated.

Alternatively, the execution body may, in response to detecting a point-and-click operation acting on the document content displayed in the document interface of the untagged document, and to that the document structure recognition result corresponding to the document content includes the tail document structure recognition result and the head document recognition result, determine the paging document content of the above document content. Wherein, the document interface may be a graphical user interface for displaying the untagged document. The point-and-click operation may be a selection operation for the displayed document content. For example, the point-and-click operation acting on the entire paragraph document content or the entire table may be three click operations. The point-and-click operation acting on the entire image can be a single-click operation. The point-and-click operation acting on a single word can be a double-click operation. The point-and-click operation acting on the entire sentence can be an operation of pressing the Alt key and clicking.

In practice, in response to determining that the above point-and-click operation is a point-and-click operation acting on the entire paragraph document content or the entire table or the entire image, the head document structure recognition result included in the document structure recognition result corresponding to the above document content may be determined as the paging document content.

In practice, in response to determining that the above point-and-click operation is a point-and-click operation acting on a single word, the paging document content of the above document content can be determined by the following steps:

Step 1, determine the document position coordinates of the point-and-click operation. The document position coordinates may be the coordinates of the position of the point-and-click operation in the untagged document. The document position coordinates may include abscissa and ordinate. For example, the document location coordinates may be PDF coordinates.

Step 2, from the tail document structure recognition result included in the document structure recognition result corresponding to the document content, extract a prior first preset number of characters of the document position coordinates to a string of tail characters, as the first tail text. A tail character can be the last character included in the tail document structure recognition result.

Step 3, from the head document structure recognition result included in the document structure recognition result corresponding to the document content, extract a prior second preset number of characters, as the head text. Here, specific settings of the first preset number and the second preset number are not limited.

Step 4, combine the first tail text and the head text into a combined text. The way of combination here can be character splicing.

Step 5, perform word segmentation processing on the combined text to obtain a word segmentation set. In practice, the above execution body may use a word segmentation algorithm to perform word segmentation processing on the combined text to obtain a word segmented set. For example, the word segmentation algorithm may be a mechanical word segmentation algorithm, a word segmentation algorithm based on a hidden Markov model, or a word segmentation algorithm based on a conditional random field.

Step 6, determine the character position coordinates of the first character of each word segmentation in the word segmentation set, as the word segmentation coordinates of the above word segmentation. Here, the character position coordinates may be the center coordinates or the upper left corner coordinates of the character bounding box.

Step 7, select, from the word segmentation set, a word segmentation whose corresponding word segmentation coordinates are closest to the document position coordinates, as the target word segmentation.

Step 8, in response to determining that the prior third preset number of strings of the head text contains the same characters as the ones in the target word segmentation, the various characters same as those in the target word segmentation and contained in the prior third preset number of strings of the head text are determined as the paging document content. The third preset number is smaller than the second preset number.

In practice, in response to determining that the above point-and-click operation is a point-and-click operation acting on the entire sentence, the paging document content of the above document content can be determined by the following steps:

Step 1, determine the document position coordinates of the point-and-click operation.

Step 2, from the tail document structure recognition result included in the document structure recognition result corresponding to the document content, extract the string from the target character to the tail character, as the second tail text. The target character may be the first character after the first end-of-sentence character before the document position coordinates. The end-of-sentence character may be a character that indicates the end of a sentence. For example, the end-of-sentence character can be ".".

Step 3, in response to determining that the second tail text does not contain an end-of-sentence character, extract, from the head document structure recognition result included in the document structure recognition result corresponding to the document content, each character before the target end-of-sentence character, as the paging document content. The target end-of-sentence may be the first end-of-sentence character included in the head document structure recognition result.

Thereafter, highlight the document content and the paging document content.

In practice, the above execution body may perform a highlight processing on the document content and a highlight processing on the paging document content, in response to determining that the point-and-click operation is a point-and-click operation acting on the entire paragraph document content or the entire table or the entire image. Wherein, the highlight processing may be a highlighting process.

In practice, the execution body may, in response to determining that the point-and-click operation is a point-and-click operation acting on a single word, determine the text from the first character to the last character in the target word segmentation in the first tail text, as the document content of the previous page, and then perform a highlight processing on the document content of the previous page and a highlight processing on the paging document content.

In practice, the execution body may, in response to determining that the point-and-click operation is a point-and-click operation acting on the entire sentence, determine the second tail text as the document content of the previous page, and then perform a highlight processing on the document content of the previous page and a highlight processing on the paging document content. In this way, when the user clicks on the content of the document displayed in pages, the content displayed in pages can be highlighted.

Alternatively, firstly, the execution body may, in response to determining that at least two untagged document pages are displayed in the document interface of the untagged document, determine the document page number of each untagged document page in the at least two untagged document pages, to get a document page number set. Thereby, each of the pages currently displayed can be determined.

Then, it may be determined whether there is a document structure recognition result satisfying a preset merging condition in the updated document structure recognition result set. The preset merging condition may be that the document page number corresponding to the document structure recognition result is a document page number in the document page number set, and that the document structure recognition result includes the tail document structure recognition result and the head document structure recognition result. In this way, it can be determined whether there is document content displayed in pages in the currently displayed document interface, according to the preset merging condition.

Finally, in response to determining that there is a document structure recognition result that satisfies the preset merging condition in the updated document structure recognition result set, for each document structure recognition result that satisfies the preset merging condition, perform a merged rendering to the document structure recognition result in the two untagged document pages corresponding to the document structure recognition result, so that the tail document structure recognition result and the head document structure recognition result included in the above document structure recognition result show a merged display effect. Wherein, the merged rendering may be rendering in the same display manner. For example, a merged rendering may be a bounding box displaying the same color. In this way, when there is document content displayed in pages in the currently displayed document interface, the document content displayed in pages can be merged and displayed.

Alternatively, the document structure recognition result in the above document structure recognition result set has corresponding document column numbers. For each untagged document page of the above untagged document, the execution body may perform the following steps:

Step 1, select the corresponding document column number from the document structure recognition result set, as the first column number, and use the document structure recognition result that satisfies the preset tail area condition, as the first column tail document structure recognition result. Wherein, the first column number may be the first column. Thus, the document structure recognition result at the tail of the first column can be determined as the first column tail document structure recognition result.

Step 2, select the corresponding document column number from the document structure recognition result set, as the second column number, and use the document structure recognition result that satisfies the preset head area condition, as the second column head document structure recognition result. Wherein, the second column number may be the second column. Thus, the document structure recognition result at the head position of the second column can be determined as the second column head document structure recognition result.

Step 3, perform a merged detection on the first column tail document structure recognition result and the second column head document structure recognition result to obtain a columnar merged detection result. Wherein, the columnar merged detection result characterizes whether the first column tail document structure recognition result and the second column head document structure recognition result are mergeable document structure recognition results. Here, reference may be made to Step 1024 in those embodiments corresponding to FIG. 1 for the manner in which the above execution body performs the merged detection, and details are not described herein again.

Step 4, in response to determining that the columnar merged detection result characterizes that the first column tail document structure recognition result and the second column head document structure recognition result are mergeable document structure recognition results, perform a merging process on the first column tail document structure recognition result and the second column head document structure recognition result included in the above document structure recognition result set, to update the document structure recognition result set. Here, reference may be made to Step 1025 in those embodiments corresponding to FIG. 1 for the manner in which the above execution body performs the merging process, and details are not described herein again.

Alternatively, the above execution body may, from the updated document structure recognition result set, extract a document structure recognition result corresponding to the target untagged document page, as the page document structure recognition result, and obtain a page document structure recognition result set. Wherein, the target untagged document page is an untagged document page displayed in the document interface of the untagged document. It can be understood as that the target untagged document page is the currently displayed untagged document page.

Then, it can be determined whether there is a page document structure recognition result that satisfies the preset columnar merging condition in the above page document structure recognition result set. Wherein, the preset columnar merging condition may be that the page document structure recognition result includes the first column tail document structure recognition result and the second column head document structure recognition result.

Afterwards, in response to determining that there is a page document structure recognition result that satisfies the preset columnar merging condition in the page document structure recognition result set, for each page document structure recognition result that satisfies the preset columnar merging condition, perform a merged rendering to the page document structure recognition result in the two columnar page modules corresponding to the page document structure recognition result, so that the first column tail document structure recognition result and the second column head document structure recognition result included in the page document structure recognition result show a merged display effect. Here, the merged rendering may be rendering in the same display manner. For example, a merged rendering may be a bounding box displaying the same color. In this way, when there is a document content displayed in columns in the currently displayed document interface, the document content displayed in columns can be merged and displayed.

It can be understood that, when the untagged document is a columnar document with more than two columns, for every two adjacent columnar document pages, it is possible to perform cross-column document content recognition for a two-column document.

The above Steps 1-4 and the related content of performing a merged rendering to the page document structure recognition result are regarded as an inventive point of the embodiments of the present disclosure, which solves the technical problem 2 mentioned in the background art, "unable to recognize the continuous document content in different document columns, users need to operate on the continuous document content in different document columns respectively, which makes it impossible to quickly perform unified operation on the continuous document content in different document columns". The factor that makes it impossible to quickly perform unified operation on the continuous document content in different document columns is often as follows: unable to recognize the continuous document content in different document columns, users need to operate on the continuous document content in different document columns respectively. If the above factor is solved, the effect of quickly performing unified operation on the continuous document content in different document columns can be achieved. In order to achieve this effect, the present disclosure determines the document structure recognition result at the end of the first column as the first column tail document structure recognition result, and determines the document structure recognition result at the head position of the second column as the second column head document structure recognition result. Afterwards, a merged detection is performed on the first column tail document structure recognition result and the second column head document structure recognition result. Secondly, in response to determining that the above columnar merged detection result characterizes that the first column tail document structure recognition result and the second column head document structure recognition result are mergeable document structure recognition results, perform a merged detection on the first column tail document structure recognition result and the second column head document structure recognition result included in the document structure recognition result set, to update the document structure recognition result set. Thus, the document structure recognition result set may include a relationship of association between the document contents displayed in columns. Furthermore, when there is a document content displayed in columns in the currently displayed document interface, the document content displayed in columns can be merged for display. In this way, it is possible to quickly perform unified operation on the continuous document content in different document columns.

It can be understood that the cross-region document content recognition method in the above embodiments of the present disclosure may refer to a cross-page document content recognition method and a cross-column document content recognition method.

The above embodiments of the present disclosure have the following beneficial effects: through the cross-region document content recognition method of some embodiments of the present disclosure, it is possible to quickly perform unified operations on the continuous document content in different pages. Specifically, the reason why it is impossible to quickly perform unified operations on the continuous document content in different pages lies in that the continuous document content in different pages cannot be recognized, and users need to operate on the continuous document content in different pages respectively, which makes it impossible to quickly perform unified operations on the continuous document content in different pages. Based on this, the cross-region document content recognition method of some embodiments of the present disclosure firstly performs a document structure recognition processing on the untagged document to obtain a document structure recognition result set. Wherein, the document structure recognition results in the document structure recognition result set correspond to document page numbers. Thereby, a document structure recognition result of the untagged document can be recognized in advance. Then, for every two adjacent document page numbers in the document page number sequence corresponding to the untagged document, the following steps are performed: Step 1, determine a first document page number in the two adjacent document page numbers as the first document page number, and a second document page number in the two adjacent document page numbers as the second document page number. Step 2, select from the document structure recognition result set a document structure recognition result that corresponds to the first document page number and satisfies a preset tail area condition, as a tail document structure recognition result. Step 3, select from the document structure recognition result set a document structure recognition result that corresponds to the second document page number and satisfies a preset head area condition, as a head document structure recognition result. Step 4, perform a merged detection on the tail document structure recognition result and the head document structure recognition result to obtain a merged detection result. Wherein, the merged detection result characterizes whether the tail document structure recognition result and the head document structure recognition result are mergeable document structure recognition results. Thus, it can be determined whether the document content at the end of the first page and the document content at the beginning of the second page of two adjacent pages are continuous. Step 5, in response to determining that the merged detection result characterizes the tail document structure recognition result and the head document structure recognition result being mergeable document structure recognition results, merge the tail document structure recognition result and the head document structure recognition result included in the document structure recognition result set, so as to update the document structure recognition result set. Thus, when it can be determined that the document content at the end of the first page and the document content at the beginning of the second page of two adjacent pages are continuous, the document structure recognition result of the document content at the end of the first page and the document structure recognition result of the document content at the beginning of the second page are merged. Also because the document structure recognition results of the continuous document content in different pages can be merged, there is a relationship of association between the document structure recognition results of the continuous document content in different pages, so it is possible to perform unified operations on the continuous document content in different pages, without the need for the user to respectively operate on the continuous document content in different pages. Therefore, unified operations can be performed on the continuous document content in different pages quickly.

Figure 2:
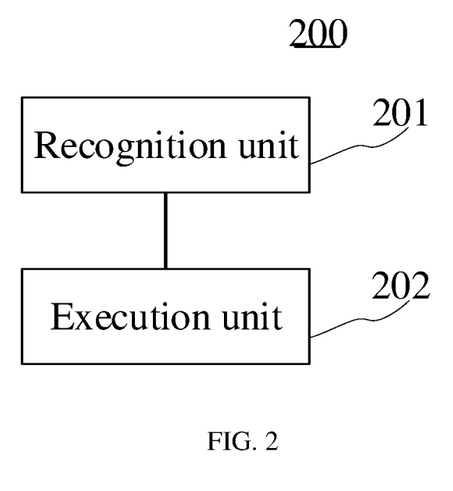
FIG. 2 is a schematic structural diagram of some embodiments of a cross-region document content recognition device according to the present disclosure.

With further reference to FIG. 2, as an implementation of the methods shown in the above figures, the present disclosure provides some embodiments of a cross-region document content recognition device for an untagged document, and these device embodiments correspond to those method embodiments shown in FIG. 1. This device can be specifically applied to various kinds of electronic apparatus.

As shown in FIG. 1, a cross-region document content recognition device 100 in some embodiments includes: a recognition unit 101 and an execution unit 102. Wherein, the recognition unit 101 is configured to perform a document structure recognition processing on the untagged document to obtain a document structure recognition result set, wherein the document structure recognition results in the document structure recognition result set corresponds to document page numbers; the execution unit 102 is configured to, for every two adjacent document page numbers in the document page number sequence corresponding to the untagged document, perform the following steps of: determining a first document page number in the two adjacent document page numbers as the first document page number, and a second document page number in the two adjacent document page numbers as the second document page number; selecting, from the document structure recognition result set, a document structure recognition result that corresponds to the first document page number and satisfies a preset tail area condition, as a tail document structure recognition result; selecting, from the document structure recognition result set, a document structure recognition result that corresponds to the second document page number and satisfies a preset head area condition, as a head document structure recognition result; performing a merged detection on the tail document structure recognition result and the head document structure recognition result, to obtain a merged detection result, wherein the merged detection result characterizes whether the tail document structure recognition result and the head document structure recognition result are mergeable document structure recognition results; in response to determining that the merged detection result characterizes the tail document structure recognition result and the head document structure recognition result being mergeable document structure recognition results, merging the tail document structure recognition result and the head document structure recognition result in the document structure recognition result set, so as to update the document structure recognition result set.

It can be understood that the units given in device 200 correspond to the respective steps in the method described in FIG. 1. Therefore, the operations, features, and beneficial effects described above with respect to the method are also applicable to device 200 and the units included therein, and details are not described herein again.

Figure 3:
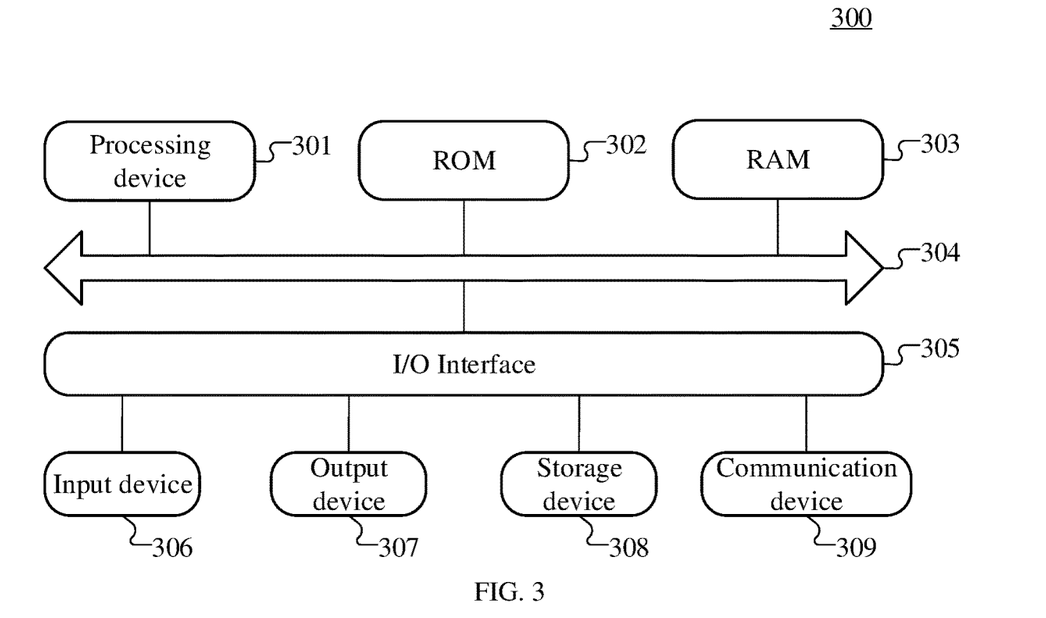
FIG. 3 is a schematic structural diagram of an electronic apparatus suitable for implementing some embodiments of the present disclosure.

Referring now to FIG. 3, a schematic structural diagram of an electronic apparatus (e.g., computing device) 300 suitable for implementing some embodiments of the present disclosure is shown. The electronic apparatus in some embodiments of the present disclosure may include, but are not limited to, mobile terminals such as mobile phones, notebook computers, digital broadcast receivers, PDAs (personal digital assistants), PADs (tablets), PMPs (portable multimedia players), in-vehicle terminals (such as in-vehicle navigation terminals) and the like, and stationary terminals such as digital TVs, desktop computers, and the like. The electronic apparatus shown in FIG. 3 is only one example, and should not impose any limitation on the function and scope of use of the embodiments of the present disclosure.

As shown in FIG. 3, the electronic apparatus 300 may include a processing device (e.g., central processing unit, graphics processor, etc.) 301, which can perform various appropriate actions and processes according to the program stored in the Read Only Memory (ROM) 302 or the program loaded from the storage device 308 into the Random Access Memory (RAM) 303. In the RAM 303, various programs and data necessary for the operation of the electronic apparatus 300 are also stored. The processing device 301, the ROM 302, and the RAM 303 are connected to each other through a bus 304. An input/output (I/O) interface 305 is also connected to bus 304.

In general, the following devices may be connected to the I/O interface 305: an input device 306 including, for example, touch screen, touchpad, keyboard, mouse, camera, microphone, accelerometer, gyroscope, etc.; an output device 307 including, for example, Liquid Crystal Display (LCD), speaker, vibrator, etc.; a storage device 308 including, for example, magnetic tape, hard disk, etc.; and a communication device 309. The communication device 309 may allow the electronic apparatus 300 to communicate wirelessly or by wire with other apparatus to exchange data. Although FIG. 3 shows an electronic apparatus 300 with various devices, it should be understood that not all of the illustrated devices are required to be implemented or provided. More or fewer devices may alternatively be implemented or provided. Each block shown in FIG. 3 may represent one device, or may represent multiple devices as required.

In particular, according to some embodiments of the present disclosure, the processes described above with reference to the flowchart may be implemented as computer software programs. For example, some embodiments of the present disclosure include a computer program product comprising a computer program carried on a computer-readable medium, the computer program containing a program code for performing the method illustrated in the flowchart. In some such embodiments, the computer program may be downloaded and installed from the network via the communication device 309, or installed from the storage device 308, or installed from the ROM 302. When the computer program is executed by the processing device 301, the above functions defined in the methods of some embodiments of the present disclosure are performed.

It should be noted that the computer-readable medium described in some embodiments of the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus, or device, or a combination of any of the above. More specific examples of computer readable storage medium may include, but are not limited to, electrical connections with one or more wires, portable computer disks, hard disks, Random Access Memory (RAM), Read Only Memory (ROM), Erasable Programmable Read Only Memory (EPROM or flash memory), optical fiber, portable Compact Disk Read Only Memory (CD-ROM), optical storage device, magnetic storage device, or any suitable combination of the above. In some embodiments of the present disclosure, a computer-readable storage medium can be any tangible medium that contains or stores a program that can be used by or in conjunction with an instruction execution system, apparatus, or device. In some embodiments of the present disclosure, a computer-readable signal medium may include a data signal propagated in baseband or as part of a carrier wave, carrying a computer-readable program code therein. Such propagated data signals may take a variety of forms, including but not limited to electromagnetic signal, optical signal, or any suitable combination of the foregoing. A computer-readable signal medium can also be any computer-readable medium other than a computer-readable storage medium. The computer-readable signal medium can transmit, propagate, or transport the program for use by or in connection with the instruction execution system, apparatus, or device. The program code included on the computer readable medium may be transmitted using any suitable medium including, but not limited to, electrical wire, optical fiber cable, RF (radio frequency), etc., or any suitable combination of the foregoing.

In some embodiments, the client and server can use any currently known or future developed network protocol such as HTTP (HyperText Transfer Protocol) to communicate, and can interconnect with digital data communication (e.g., communication network) in any form or medium. Examples of communication networks include Local Area Network ("LAN"), Wide Area Network ("WAN"), internet (e.g., the Internet), and peer-to-peer networks (e.g., ad hoc peer-to-peer networks), as well as any currently known or future developed network.

The computer-readable medium may be included in the above electronic apparatus; or may exist alone without being assembled into the electronic apparatus. The computer-readable medium carries one or more programs, and when the one or more programs are executed by the electronic apparatus, the electronic apparatus is made to: perform document structure recognition processing on the untagged document, to obtain a document structure recognition result set, wherein, the document structure recognition results in the document structure recognition result set correspond to document page numbers; for every two adjacent document page numbers in the document page number sequence corresponding to the untagged document, perform the following steps to: determine a first document page number in the two adjacent document page numbers as the first document page number, and a second document page number in the two adjacent document page numbers as the second document page number; select, from the document structure recognition result set, a document structure recognition result that corresponds to the first document page number and satisfies a preset tail area condition, as a tail document structure recognition result; select, from the document structure recognition result set, a document structure recognition result that corresponds to the second document page number and satisfies a preset head area condition, as a head document structure recognition result; perform a merged detection on the tail document structure recognition result and the head document structure recognition result, to obtain a merged detection result, wherein the merged detection result characterizes whether the tail document structure recognition result and the head document structure recognition result are mergeable document structure recognition results; in response to determining that the merged detection result characterizes the tail document structure recognition result and the head document structure recognition result being mergeable document structure recognition results, merge the tail document structure recognition result and the head document structure recognition result included in the document structure recognition result set, so as to update the document structure recognition result set.

The computer program code for carrying out operations of some embodiments of the present disclosure may be written in one or more programming languages, including object-oriented programming languages such as Java, Smalltalk, C++, or a combination thereof, and further including conventional procedural programming languages, such as the "C" language or similar programming languages. The program code may execute entirely on the user's computer, partly on the user's computer, as a stand-alone software package, partly on the user's computer and partly on a remote computer, or entirely on the remote computer or server. In the case involving a remote computer, the remote computer may be connected to the user's computer through any kind of network, including a Local Area Network (LAN) or a Wide Area Network (WAN), or may be connected to an external computer (e.g., using an Internet service provider to connect via the Internet).

The flowchart and block diagram in the accompanying drawings illustrate the architecture, functionality, and operation that could possibly be implemented by the system, method and computer program product of the various embodiments of the present disclosure. In this regard, each block in the flowchart or block diagram may represent a module, a program segment, or a portion of code. The module, program segment, or portion of code contains one or more executable instructions for implementing the specified logical functions. It should also be noted that, in some alternative implementations, the functions noted in the blocks may occur in an order different from that noted in the accompanying drawings. For example, two blocks shown in succession may, in fact, be executed substantially concurrently, or they may sometimes be executed in the reverse order, depending upon the functionality involved. It should also be noted that each block of the block diagram and/or flowchart, and combinations of blocks in the block diagram and/or flowchart, can be implemented by a dedicated hardware-based system that performs the specified function or operation, or be implemented by a combination of dedicated hardware and computer instructions.

The units described in some embodiments of the present disclosure may be implemented by means of software, and may also be implemented by means of hardware. The described unit can also be provided in the processor, and for example, can be described as: a processor comprising a recognition unit and an execution unit. Wherein, the names of these units do not constitute a limitation of the units themselves under certain circumstances. For example, the recognition unit can also be described as "a unit that performs a document structure recognition processing on the untagged document and obtains a document structure recognition result set".

The functions described above may be performed, at least in part, by one or more hardware logic components. For example, without restriction, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logical Device (CPLD) and more.

Some embodiments of the present disclosure also provide a computer program product, including a computer program, which, when executed by a processor, implements any of the foregoing cross-region document content recognition methods.

The above description is merely some preferred embodiments of the present disclosure and illustrations of the applied technical principles. Those skilled in the art should understand that the scope of the invention involved in the embodiments of the present disclosure is not limited to the technical solutions formed by the specific combination of the above technical features, and should cover at the same time, without departing from the above inventive concept, other technical solutions formed by any combination of above technical features or their equivalent features, for example, a technical solution formed by replacing the above features with the technical features of similar functions disclosed (but not limited to) in the embodiments of the present disclosure.

What is claimed is:

1. A cross-region document content recognition method for an untagged document, comprising:
   performing a document structure recognition processing on the untagged document to obtain a document structure recognition result set, wherein document structure recognition results in the document structure recognition result set correspond to document page numbers;
   for every two adjacent document page numbers in a document page number sequence corresponding to the untagged document, performing the following steps to:
      determine a first document page number in the two adjacent document page numbers as the first document page number, and a second document page number in the two adjacent document page numbers as the second document page number;
      select, from the document structure recognition result set, a document structure recognition result that corresponds to the first document page number and satisfies a preset tail area condition, as a tail document structure recognition result;
      select, from the document structure recognition result set, a document structure recognition result that corresponds to the second document page number and satisfies a preset head area condition, as a head document structure recognition result;
      perform a merged detection on the tail document structure recognition result and the head document structure recognition result, to obtain a merged detection result, wherein the merged detection result characterizes whether the tail document structure recognition result and the head document structure recognition result are mergeable document structure recognition results;

in response to determining that the merged detection result characterizes the tail document structure recognition result and the head document structure recognition result being mergeable document structure recognition results, merge the tail document structure recognition result and the head document structure recognition result included in the document structure recognition result set, so as to update the document structure recognition result set.

2. The method of claim 1, wherein the method further comprises:

in response to detecting a point-and-click operation acting on a document content displayed in an document interface of the untagged document, and the document structure recognition result corresponding to the document content includes the tail document structure recognition result and the head document recognition result, determining a paging document content of the document content;

performing a highlight processing on the document content and the paging document content.

3. The method of claim 1, wherein the method further comprises:

in response to determining that at least two untagged document pages are displayed in an document interface of the untagged document, determining a document page number of each untagged document page in the at least two untagged document pages, to get a document page number set;

determining whether there is a document structure recognition result satisfying a preset merging condition in the updated document structure recognition result set, wherein the preset merging condition is that the document page number corresponding to the document structure recognition result is a document page number in the document page number set, and the document structure recognition result includes the tail document structure recognition result and the head document structure recognition result;

in response to determining that there is a document structure recognition result that satisfies the preset merging condition in the updated document structure recognition result set, and for each document structure recognition result that satisfies the preset merging condition, performing a merged rendering on the document structure recognition result in two untagged document pages corresponding to the document structure recognition result, so that the tail document structure recognition result and the head document structure recognition result included in the document structure recognition result show a merged display effect.

4. The method of claim 1, wherein the untagged document is a columnar document; and the selecting from the document structure recognition result set a document structure recognition result that corresponds to the first document page number and satisfies a preset tail area condition as a tail document structure recognition result, comprises:

selecting, from the document structure recognition result set, a document structure recognition result that corresponds to the first document page number and satisfies the preset tail area condition and a preset tail column condition as the tail document structure recognition result.

5. The method of claim 4, wherein the selecting from the document structure recognition result set a document structure recognition result that corresponds to the second document page number and satisfies a preset head area condition as a head document structure recognition result, comprises:

selecting, from the document structure recognition result set, a document structure recognition result that corresponds to the second document page number and satisfies the preset head area condition and a preset head column condition as the head document structure recognition result.

6. The method of claim 1, wherein the performing a merged detection on the tail document structure recognition result and the head document structure recognition result to obtain a merged detection result, comprises:

determining a document type of the tail document structure recognition result as a tail document type;

determining a document type of the head document structure recognition result as a head document type;

based on the tail document type and the head document type, performing a merged detection on the tail document structure recognition result and the head document structure recognition result, to obtain the merged detection result.

7. An electronic apparatus, comprising:

one or more processors;

a storage device, on which one or more programs are stored, when the one or more programs are executed by the one or more processors, the one or more processors are made to implement the method of claim 1.

8. A non-transitory computer-readable medium, on which a computer program is stored, wherein the program when executed by a processor implements the method of claim 1.

* * * * *